350-96.15
3/2/82    XR    4,317,699

United States Patent [19]
Winzer et al.

[11]  4,317,699
[45]  Mar. 2, 1982

[54] METHOD FOR MANUFACTURE OF BRANCH ELEMENT

[75] Inventors: Gerhard Winzer; Franz Auracher, both of Munich, Fed. Rep. of Germany

[73] Assignee: Siemens Aktiengesellschaft, Berlin & Munich, Fed. Rep. of Germany

[21] Appl. No.: 93,519

[22] Filed: Nov. 13, 1979

[30]  Foreign Application Priority Data

Nov. 29, 1978 [DE]  Fed. Rep. of Germany ....... 2851679

[51] Int. Cl.³ .............................................. G02B 5/14
[52] U.S. Cl. ................................ 156/629; 156/159; 156/304.2; 156/304.5; 350/96.15; 350/320
[58] Field of Search ............... 350/96.15, 96.16, 320; 156/158, 159, 304.2, 304.5, 629

[56]  References Cited

U.S. PATENT DOCUMENTS 3,870,396  3/1975  Racki et al. ................. 350/96.16
3,874,779  4/1975  Thiel .......................... 350/96.16
4,130,345  12/1978  Doellner ................... 350/96.15 X
4,176,908  12/1979  Wagner ...................... 350/96.15

FOREIGN PATENT DOCUMENTS 52-64939  5/1977  Japan ......................... 350/96.15

OTHER PUBLICATIONS

Beall et al., "Bearbeitbare Glaskeramik," *Feinwerktechnik & Micronic,* vol. 76, No. 3, 1972, pp. 107–111.
Bloem et al., "Fiber–Optic Coupler," *IBM Tech. Discl. Bull.,* vol. 16, No. 1, Jun. 1973, pp. 146–147.
Kendall, "On Etching Very Narrow Grooves In Silicon," *Appl. Phys. Ltrs.,* vol. 26, No. 4, Feb. 1975, pp. 195–198.

*Primary Examiner*—John D. Lee
*Attorney, Agent, or Firm*—Hill, Van Santen, Steadman, Chiara & Simpson

[57]  ABSTRACT

A branch element and method of making the element which distributes light signals from an incoming waveguide to outgoing waveguides characterized by a member having a pair of aligned waveguides received in channels with their end faces separated by a partially reflective layer and at least one branch waveguide engaging a portion of the surface of one of the aligned waveguides adjacent the reflective layer so that a light signal reflected by the layer is received in the branch waveguide. The method involves providing a single member having grooves for receiving each of the waveguides, cutting the member into two parts, polishing the cut edges to form polished surfaces with one of the surfaces being provided with the partially reflecting layer and joining the waveguide together. The position for the cutting is selected to be in a plane removed from the groove for the branch waveguide so that after polishing, the reflector is positioned in the desired relationship to the branch waveguide.

14 Claims, 9 Drawing Figures

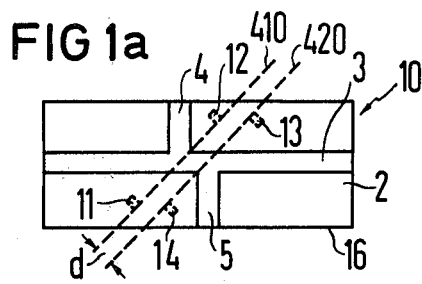
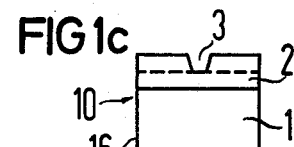
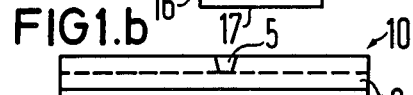
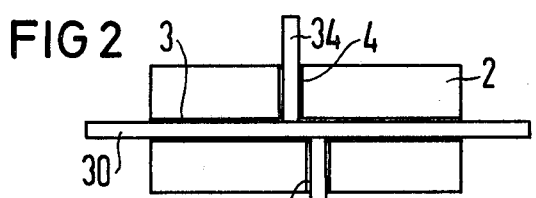
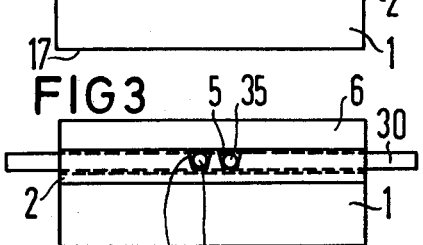
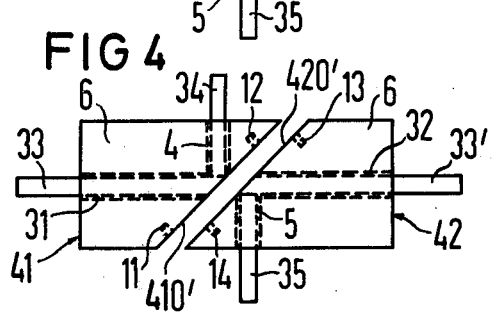
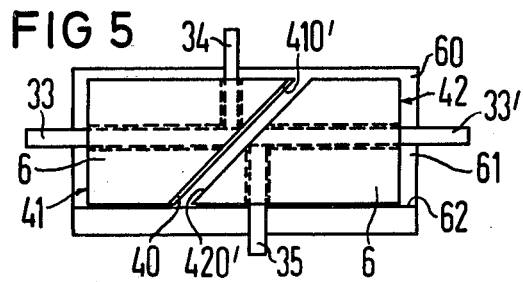
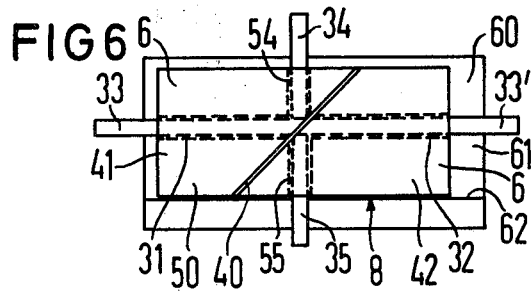
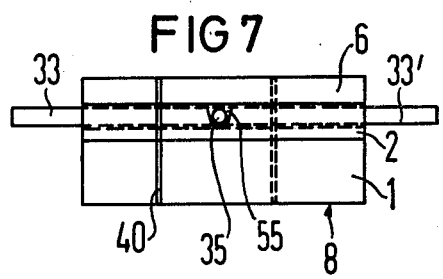

METHOD FOR MANUFACTURE OF BRANCH ELEMENT

BACKGROUND OF THE INVENTION

The present invention is directed to a branch element for distributing light from an incoming light waveguide to outgoing light waveguides and the method of manufacturing the element.

For optical communication transmissions, which utilize light waveguides, in addition to the light waveguides and the active components such as for example transmitters and receivers, diverse passive elements are required. Thus, it is often necessary to distribute the optical signal to various receivers and as a consequence a branch element is required.

SUMMARY OF THE INVENTION

It is the object of the present invention to provide a branch element for a light waveguide which is simple in its construction and therefore can be manufactured in a low cost process which utilizes a series of process steps.

To achieve these tasks, the present invention is directed to a branch element for distributing light in an incoming light waveguide to outgoing light waveguides comprising a member having at least three guide channels for receiving light waveguides, two of said channels being axially aligned and having ends being separated by at least one semi-permeable reflector layer extending obliquely to the axis of the aligned channels, a branch channel extending at an angle to one of the axially aligned channels from adjacent the end thereof, said branch channel and the aligned channels forming a plane receiving a surface normal of the relfective layer with the surface normal approximately bisecting the angle formed by the branch channel and the one aligned channel, and light waveguides arranged in each of said channels with the waveguides disposed in the aligned channels having end surfaces extending into approximate contact with the semipermeable reflective layer and the waveguide in the branch channel having an end surface extending into contact with the waveguide in said one channel.

Preferably, the angle between the waveguide in the branch channel and the one waveguide is 90° so that the surface normal forms an angle of 45° with the axis of each of the two waveguides. In a preferred embodiment, the branch element includes an additional branch channel disposed on the other side of the reflective layer from the first mentioned branch channel and this additional channel is aligned therewith. The other branch channel extends into the other aligned channel and forms an angle therewith with the angle being approximately bisected by the surface normal of the reflective layer. The additional branch channel receives a light waveguide having an end terminating adjacent the other waveguide in the other aligned channel so that the waveguides in the branch channels are axially aligned branched waveguides and each of the waveguides in the aligned channels can be utilized as an incoming waveguide with a portion of the signal contained therein being branched into one of the branched waveguides and the other aligned waveguides. The reflective layer can extend over only a portion of the end face or surface of each of the waveguides in the aligned channel or over the entire end face.

To produce the branch element, the method comprises the steps of providing an initial member consisting of a material exhibiting the same polishing properties as the light waveguides; forming a first groove for a guide channel for a light waveguide and at least one branch groove extending from the first groove for receiving a branch light waveguide in a surface of the initial member; inserting and securing a continuous light waveguide in the first groove and a branch waveguide in each branch groove; cutting the member along a plane extending at an angle to the first groove to form two parts having cut surfaces and to divide the continuous waveguide into two main waveguides; polishing the cut surface of each part and the end face of the main waveguide associated therewith, said step of cutting locating the plane of the cutting so that the polished surface of the part lies at the intersection of the axes of the branch waveguide and the main waveguide; applying a partial reflective coating to at least part of the end face of one of said two parts to cover at least a portion of the polished end face of the main waveguide of the part; bringing the two parts into contact with each other with the axes of the main waveguides being axially aligned; and securing the parts together to form the element.

The initial member may be composed of a crystal material and the step of forming the groove forms the grooves by anisotropic etching. The material of the initial member may also be composed of a photo-sensitive etchable glass and the grooves are formed by etching the glass. It is also possible that the initial member is made of a plastic deformable material and the step of forming the grooves is accomplished by means of stamping or embossing the grooves into a surface of the member. In each of these embodiments, it is desirable to apply a cover member to the initial member after the insertion and securing of the waveguides in the groove and prior to cutting the member into two parts.

Another feature of the method includes providing polishing marks on the surface of the initial member which polishing marks indicate the limit for polishing of the cut surface. These polishing marks may be recesses on the surface of the member and the step of providing the polishing marks then forms these marks as resesses on the surface.

Preferably, two branch grooves are provided on the surface of the initial member and the branch grooves are offset from each other along the first groove by a distance equal to the amount of material thickness of the member that is removed by the step of cutting and polishing so that after joining the two parts together, the branch waveguides are axially aligned and on opposite sides of the reflective layer.

To facilitate aligning the members, the initial member is provided with two cleanly processed guide surfaces which are disposed at an angle relative to one another, the step of providing the first continuous groove provides the groove to extend parallel to at least one of said guide surfaces. The step of bringing the two parts together to complete the unit includes providing a base member having a base surface and a stop surface, placing the two parts on the base member with one of the pair of guide surfaces being received on the base surface and moving the parts together with the other of said guide surfaces being engaged on said stop surface to provide the two guide surfaces. Preferably, the initial member has a substantially rectangular cross section.

A particular advantage of the branch element lies in the fact that it can be manufactured solely with conventional photo-lithographic techniques, in which there is a particular good mastery at present. In addition, it can be manufactured in self adjusting fashion and can be manufactured utilizing a series of process steps.

The proposed branch element corresponds in effect to a classic beam divider. In spite of its small size, the element is very robust due to the simple and compact method of construction. A series connection of a plurality of these elements is also readily possible with only minimal coupling losses.

DESCRIPTION OF THE DRAWINGS

FIG. 1a is a plan view of an initial member used in forming the branched element of the present invention;

FIG. 1b is a side view of the initial member of FIG. 1a;

FIG. 1c is an end view of the member;

FIG. 2 is a plan view of the member with the waveguides inserted in the grooves;

FIG. 3 is a side view of the member with a cover member;

FIG. 4 is a plan view after cutting the member into two parts;

FIG. 5 is a plan view with the reflective layer applied to one of the polished surfaces;

FIG. 6 is a plan view of the two parts joined together to form the branch element of the present invention; and FIG. 7 is a side view of the branch element.

DESCRIPTION OF THE PREFERRED EMBODIMENT

The principle of the present invention is particularly useful in producing a branched element generally indicated at 8 in FIGS. 6 and 7. The branch element 8 comprises a member 50 composed of two parts 41 and 42 which parts are separated by a partially reflective light transmissive layer 40. The member 50 has a pair of aligned channels 31 and 32, which receive main waveguides 33 and 33' whose axes are axially aligned. In addition, the member 50 has branch channels 54 and 55, which are also axially aligned and receive branch waveguides 34 and 35 whose axes are aligned. As illustrated, the reflective layer 40 lies on the intersection of an axis for the waveguide 33 and the waveguide 34 as well as the intersection of the axes of the waveguides 35 and 33'. The reflective layer 40 has a surface normal, which will bisect the angle formed by the axes of the waveguides 33 and 34 as well as the angle formed by the axes of the waveguides 33' and 35. As illustrated, these angles that are bisected by the normal of the reflective layer 40 are 90° angles so that the normal forms a 45° angle with each of the axes.

In view of the presence of the two branch waveguides 34 and 35, an incoming light signal carried on the waveguide 33, which may be an optical fiber, has a portion of the signal reflected through the branch waveguide 34 and a remaining portion is transmitted along the waveguide 33'. In a similar manner, if a signal is incoming on the waveguide 33', a portion will be reflected by the surface 40 into the branch waveguide 35 while the portion passing through the reflective layer 40 will exit on the waveguide 33.

To form the element 8, an initial member 10 as illustrated in FIGS. 1a, 1b and 1c is provided. This initial member 10 may consist of the substrate 1, for example, a processed glass ceramic, such as discussed by G. H. Beall et al in *Feinwerktechnik und Micronic,* 76/3, 1972, page 107 or pressed glass or other true-to-size ceramics. On the substrate 1, a layer 2 is applied. The layer 2 may be of silicon or another crystal material which can be anisotropically etched, for example in a privileged direction as discussed by D. L. Kendall, *Applied Physics Letter,* 26/4, 1975, page 195. The initial member 10 with guide surfaces 16 and 17, is then etched by anisotropically etching the surface of the layer 2 to provide a first groove 3 for a guide channel and branch grooves 4 and 5 extending perpendicular from the groove 3, which extends parallel to the surfaces 16 and 17. As illustrated, the positions of the grooves 4 and 5 are selected to be in a desired geometry and space along groove 3 to compensate for the cutting of the member into two parts 41 and 42 and for the loss of material due to polishing the cut surfaces. As illustrated in FIG. 1a, the material between lines 410 and 420 will be lost during cutting of the member 10 into the two parts and polishing the cut surfaces to the desired optical quality. This thickness or distance d between lines 410 and 420 is utilized in calculating the amount of offset between the grooves 4 and 5. As illustrated, the polished surface represented by line 410 is intended to lie on the intersection of the axes of the groove 3 and groove 4 and the polished surface represented by line 420 will lie on the intersection of the axes of the groove 3 and the groove 5.

To facilitate locating the polished surfaces relative to these points of intersection, a surface of the layer 2 is provided with polishing marks 11, 12, 13 and 14 with the marks 11 and 12 defining the line or surface 410 and the marks 13 and 14 defining the line or surface 420. These marks 11-14 may be recesses which are introduced into the surface at the same time as forming the grooves 3, 4 and 5.

After forming the grooves 3, 4 and 5, a continuous waveguide 30 such as an optical fiber is inserted in the groove 3 and secured therein and branch waveguides 34 and 35 are placed in the branch grooves 4 and 5 with the ends of the waveguides 34 and 35 forming a butt-joint with the waveguide 30. Each of the waveguides can be an optical glass fiber particularly an optical fiber having either a step index profile or a graded index profile and having a circular cross-section with a cylindrical surface.

After inserting the waveguides 30, 34 and 35 in their respective grooves, they are mounted or secured in the groove by applying an adhesive for example an optical cement or adhesive. Then preferably, a cover plate 6 (FIG. 3) is secured or placed on the surface of the member 10 to cover the grooves. The plate 6 can be applied by an optical cement or adhesive, which after curing or setting causes the waveguides to be immovably held in the channels formed by the grooves.

After applying the cover plate 6, the device may be cut into two parts 41 and 42 by means of a circular cutter or rotating saw blade. The step of cutting with the circular cutter also divides the groove 3 into channels 31 and 32 and divides the continuous waveguide 30 into two main waveguides 33 and 33' which are in channels 31 and 32, respectively. The circular cutter is applied between lines 410 and 420 and guided to move therebetween during the act of cutting the member 10 into the two parts 41 and 42. The cut faces formed by the circular cutter are then polished and brought to the desired optical quality. The polishing also proceeds parallel to the line 410 and 420 to form the polished surfaces 410' and 420', whose positions are determined by the polishing marks 11-14. The step of polishing is carried out until the polishing marks indicate that the desired position for each polished surface has been reached. It should be noted that each of the polished surfaces such as 410' will have a surface normal which will bisect an angle formed by the axis of the main waveguide 33 and the branch waveguide 34 while the polished surface 420' has a surface normal which will bisect the angle formed by the axes of the waveguide 35 and the main waveguide 33'. After forming the polished surfaces 410' and 420' one of the surfaces such as 410' is provided with the partially reflective or permeably reflective layer 410. This layer may be applied by vapor depositing a suitable metal such as aluminum on the surface such as 410'.

To join the two parts 42 and 41 together to form the element 8, a base member 60, which has a base surface 61 and a longitudinal stop surface 62 is provided. Preferably, guide surfaces 16 and 17 of the initial member 10 as illustrated in FIG. 1c, extend at an angle to each other which angle, as illustrated, is a right angle. The parts 41 and 42 are placed on the base member 60 with the guide surface such as 17 being on the base surface 61. The other guide surface 16 engages the stop surface 62. Thus, by moving the two parts 41 and 42 towards each other, the two parts can be brought together with the layer 40 separating the polished surfaces and with the axes of the main waveguides 33 and 33' being axially aligned. It is noted, that the two branch waveguides 34 and 35 will also be axially aligned. After bringing the two parts together, they are interconnected together to form the unit 8 by utilizing a cement or an appropriate optical adhesive. As illustrated, the reflective layer 40 is inclined at an angle 45° relative to the axis of the guide channels 31 and 32 and also to the guide channels 4 and 5. Thus, the normal of the surface for the reflective layer 40 forms an angle of 45° with each of the axes of each of the four waveguides 33, 33', 34 and 35.

The reflective layer 40 may extend over the entire end surface or face of the waveguides 33 and 33' or may be applied so that it only covers a part of the cross section of each of the light waveguides 33 and 33'. In the second arrangement, where it only covers part of the cross section, then only part of the light conveyed by the waveguide will impinge on the reflective layer with the remaining part propagating between the two waveguides in an unobstructed fashion.

Instead of the initial member 10 being of a crystal surface on a substrate which surface is anisotropically etchable, such as for example silicon, it is also possible to employ an initial member with a surface consisting of a photo-sensitive etchable glass into which the grooves are like-wise etched photo-lithographically but without privilege or preferential etching direction. Moreover, the grooves can be advantageously manufactured by stamping or embossing the grooves into a deformable plastic material forming the layer or portion 2.

It can also be noted that the initial member does not need to be constructed of the layer formation 2 or a substrate 1 as illustrated. Thus, the member 10 can also be a homogeneous member for example of one material such as for example silicon.

Although various minor modifications may be suggested by those versed in the art, it should be understood that we wish to embody within the scope of the patent granted hereon, all such modifications as reasonably and properly come within the scope of our contribution to the art.

We claim:

1. A method of manufacturing a branch element having two main light waveguides axially aligned and having end faces separated by a partially reflective layer and at least one branch light waveguide extending from the end of one of the main waveguides and the reflective layer, said method comprising the steps of providing an initial member consisting of material exhibiting the same polishing properties as the light waveguides; forming a first groove for a guide channel for a light waveguide and at least one branch groove extending from the first groove for receiving a branch light waveguide in a surface of said initial member; inserting and securing a continuous light waveguide in the first groove and a branch waveguide in each branch groove with an end face in contact with a cylindrical surface of the continuous light waveguide; then cutting said member along a plane extending at an angle to the first groove and at a point spaced from each intersection of the axes of the continuous light waveguide and a branch waveguide secured in said grooves to form two parts having cut surfaces and to divide the continuous waveguide into two main waveguides; polishing the cut surfaces of each part and the end face of the main waveguide associated therewith, said steps of cutting and polishing locating the plane of cutting so that after the step of polishing the polished surface of the part lies in the intersection of the axes of the branch waveguide and the main waveguide; applying a partially reflective coating to at least part of the polished end face of one of said two parts to cover at least a portion of the polished end face of the main waveguide of the part; bringing the two parts into contact with each other with the partially reflective coating therebetween and with the axes of the main waveguides being axially aligned; and securing the parts together to form the element.

2. A method according to claim 1, which includes the step of applying a cover member to said initial member after inserting and securing the waveguides in said grooves and prior to cutting the member into two parts.

3. A method according to claim 1, wherein the initial member is of a crystal material and said step of forming the grooves forms the grooves by an anisotropic etching.

4. A method according to claim 1, wherein the initial member comprises a photo-sensitive etchable glass, and wherein the step of forming the grooves comprises etching the glass to form the grooves.

5. A method according to claim 1, wherein the initial member comprises a plastically deformable material and said step of forming the grooves comprises embossing the grooves into a surface of said initial member.

6. A method according to claim 1, which includes providing polishing marks on a surface of the member, said polishing marks indicating the limit for polishing of the cut surface.

7. A method according to claim 6, wherein the polishing marks are recessed on the surface of the member and said step of providing the polishing marks forms said recesses.

8. A method according to claim 1, wherein the step of providing the initial member provides an initial member having two cleanly processed guide surfaces disposed at an angle relative to one another, said step of providing the first continuous groove provides the groove to extend parallel to one of said guide surfaces and said step of bringing the two parts together to complete the unit includes providing a base member having a base surface and a stop surface, placing the parts on the base member with one of the pair of guide surfaces being received on the base surface and moving the parts together with the other of said guide surfaces being engaged on said stop surface.

9. A method according to claim 8, wherein the initial member comprises a member having a substantially rectangular cross section.

10. A method according to claim 1, wherein two branch grooves are provided on the surface of the initial member, said branch grooves being parallel to each other and being offset along the first groove by a distance equal to the thickness of the initial member that is removed by the steps of cutting and polishing, said step of cutting being on a plane extending between said branch grooves so that after joining the two parts together, the branch waveguides are axially aligned and on opposite surfaces of the reflective layer.

11. A method according to claim 10, which includes a step of applying a cover member to said initial member after inserting and securing the waveguides in said grooves and prior to cutting the member into two parts.

12. A method according to claim 10, which includes providing two sets of polishing marks on the member, said sets being spaced apart an amount equal to said offset, each set of polishing marks indicating the limit for polishing of the cut surface.

13. A method according to claim 12, wherein the polishing marks are recesses on the surface of the member and said step of providing the polishing marks forms said recesses.

14. A method according to claim 10, wherein the step of providing the initial member provides an initial member having two cleanly processed guide surfaces disposed at an angle relative to one another, said step of forming the first groove provides the first groove to extend parallel to said guide surfaces and said step of bringing the two parts together to complete the element includes providing a base member having a base surface and a stop surface, placing the parts on the base member with one of the pair of guide surfaces being received on the base surface and moving the parts together with the other of said guide surfaces being engaged on said stop surface.

* * * * *